Feb. 24, 1931.                L. KLAFF                 1,794,115
                              AIR FILTER
                          Filed May 10, 1926
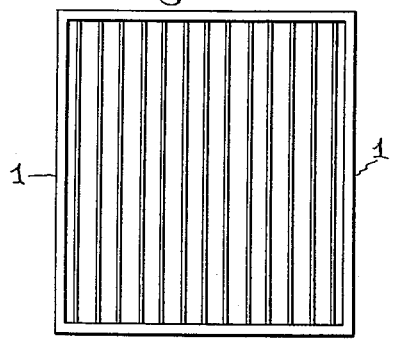
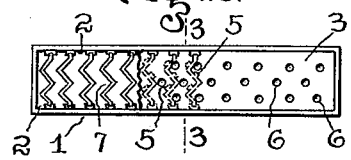
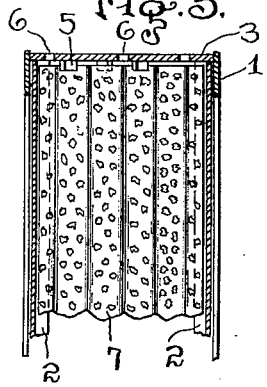
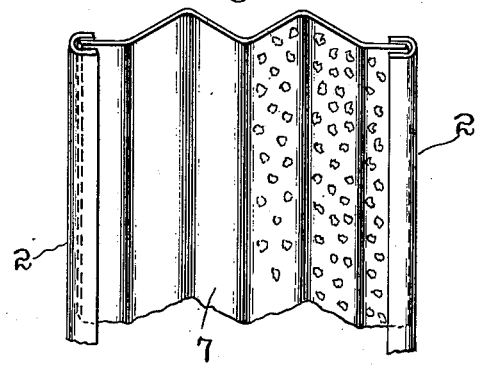
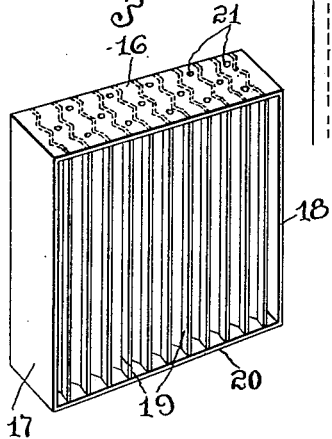
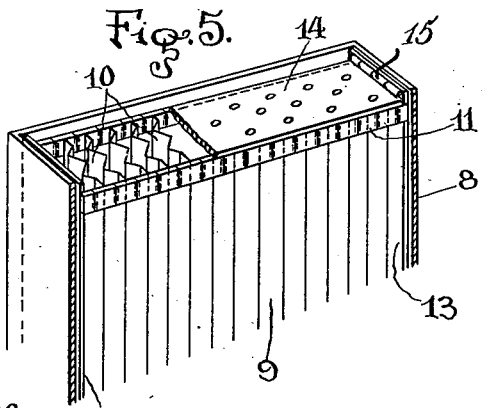
INVENTOR
Louis Klaff
BY
ATTORNEY Patented Feb. 24, 1931

1,794,115

UNITED STATES PATENT OFFICE

LOUIS KLAFF, OF BROOKLYN, NEW YORK, ASSIGNOR, BY MESNE ASSIGNMENTS, TO AMERICAN AIR FILTER COMPANY, INC., OF NEW YORK, N. Y., A CORPORATION OF DELAWARE

AIR FILTER

Application filed May 10, 1926. Serial No. 107,890.

My invention is for an improvement in air filters.

An object of my invention is to provide an inexpensive filter media which may be replaced by new media in lieu of cleaning the old media as has been done heretofore. A further object is to provide means to allow such change to be made easily and rapidly. A still further object is to provide a collapsible filter unit to facilitate transportation with means to hold the same extended in its operable form. A still further object is to provide a filter casing having means to retain separate individual filter baffles which comprise the filter media. A still further object is to construct the filter media so that a viscous coating will more readily adhere thereto. A still further object is to treat the filter media, to prevent excessive absorption of the viscous coating.

I accomplish these objects by the device illustrated in the accompanying drawings, in which Figure 1 is a front view of a filter section.

Figure 2 is a top view of the same with the cover partly broken away.

Figure 3 is an enlarged sectional detail on line 3—3 of Figure 2.

Figure 4 is an enlarged detail view of a single baffle and guide means.

Figure 5 is a modification showing a collapsible filter unit in the casing with the front thereof broken away, and Figure 6 is a further modification showing a non-collapsible filter unit.

Similar characters of reference refer to similar parts throughout the several views.

The filter includes a rectangular casing which is preferably made of metal. Laterally spaced in the casing 1 are guides 2, 2 which may be U-shaped as shown in Figure 4. These guides are located at directly opposite points at front and rear of the casing 1. The removable cover 3 and the fixed bottom (not shown) of the casing are similar, each having inwardly extending lugs 5, 5 to further retain the filter media in conjunction with guides 2, 2 as will be pointed out below. The sides of the casing 1 extend above the cover 3 to form a tray which holds an oil soaked pad. The cover 3 has holes 6, 6 therein to permit oil or other viscous matter to drip therethrough from the pad onto the baffles 7, 7.

The baffles 7 are preferably made of heavy paper or cardboard or a pressed board composition of some inexpensive material. In placing the baffles, which are the filter media, in the casing 1, the cover 3 is removed and the individual baffles 7 are slid into the guides 2, 2 until they seat against the bottom of the casing 1 to be held by lugs (not shown) which are identical with the lugs 5, 5 of the cover 3 and directly opposed thereto. The cover 3 is then put on the casing 1 with the lugs 5, 5 alternately on opposite sides of the baffle 7, as clearly appears in Figures 2 and 3.

In Figure 5 is shown a modification, in which the filter medium is a complete unit. The casing 8 which supports this unit is rectangular, the walls of which are alone the guide means for the unit 9. The unit is made up of a plurality of baffles 10, 10 which are similar in all respects to the baffles used in the device of Figure 1. Along the top and bottom edges and on the front and rear sides of the baffles 10, 10 are stringers 11, 11 of heavy paper or other thin tough material to which the baffles are fixed. These stringers are creased to bend at the baffles and also intermediate the baffles to allow the baffles 10, 10 to lie against one another to render the unit compact for transportation. The side walls 12, 13 of the unit are also fastened to the stringers 11, 11 and extend slightly above and below the baffles 10, 10. A cover 14 is hinged at 15 to the side wall 13 so as to abut the inside surfaces of the walls 12, 13 to hold the stringers extended and the baffles spaced. The bottom (not shown) is similarly hinged to the wall 12 to space the baffles at the bottom of the unit. The hinges for the cover and bottom are fastened to the side walls to allow the cover and bottom to be swung back against the outside of their respective side walls. The cover 14 is provided with holes as in Figure 1 through which viscous matter may drip to keep the baffles coated therewith. The space between the cover and the top of the casing serves as the tray for the oil soaked pad.

In Figure 6 is shown a further modification in which the filter unit is non-collapsible. This unit fits a casing identical with that of Figure 5. The cover 16 is fixed rigidly to the side walls 17, 18 as is the bottom 20 so that a rectangular frame is formed. Mounted in this frame are baffles 19, 19 which are fixed to the cover 16 and to the bottom 20. This cover 16 is also provided with holes 21 for admission of the viscous matter to the baffles 19, 19. This modification is similar to that of Figure 5 except that it is rigid.

The surface of the baffles are roughened to better retain the viscous matter with which the baffles are coated. This may be done by puncturing the baffles or by cutting or scratching the surface. Before the baffles are covered with the viscous matter, they are sprayed or coated with paint or sizing. If this were not done the baffles would become soaked with the viscous matter which would render the baffles soft and therefore weak. They would also absorb a quantity of the oil or viscous matter greatly in excess of the quantity required for efficient operation of the filter. It is of course understood that the oil soaked pad need not be used when the baffles are covered with the viscous matter in their manufacture.

Instead of cleaning the filter media as has been the practice heretofore, the used baffles, i. e. the filter media, are thrown away and new, clean baffles inserted in the casing. This is possible because the filter media is made of very inexpensive material as is above defined. By reason of this the usual washing or cleaning apparatus and the additional expense of providing and maintaining the same is obviated.

Having thus described my invention, I claim:

1. In an air filter, a baffle constructed of pressed board having roughened surfaces, a coating of sizing on said surfaces and viscous matter covering said coating.

2. In an air filter, the combination of a casing, vertical guides at the front and rear of the casing, baffles removably positioned in said guides and a tray in the casing above said baffles having perforations through which a viscous coating is supplied to the baffles.

3. In an air filter, the combination of a casing having an opening for the passage of air, baffle guides extending across said opening, and baffles positioned in engagement with said guides.

4. In an air filter, the combination of a casing having an opening for the passage of air, a plurality of baffles, guides extending across said opening to engage edge portions of said baffles, and spacing guides positioned to engage end portions of said baffles.

5. In an air filter, the combination of a casing having an opening for the passage of air, a plurality of baffles bendable to zig-zag shape, and lugs extending inwardly from said casing and adapted to engage spaced portions of each baffle to retain the same in said zig-zag shape.

6. In an air filter, the combination of a casing having an opening for the passage of air, a plurality of baffles bendable to zig-zag shape, and baffle guide means comprising lugs arranged in staggered relation and positioned to engage spaced portions of each baffle to retain the same in zig-zag shape.

7. In an air filter, the combination of a casing having an opening for the passage of air, a plurality of baffles bendable to zig-zag shape, baffle guides extending across said opening, and baffle engaging lugs arranged in staggered relation and adapted to retain said baffles in said zig-zag shape.

In testimony whereof I affix my signature.

LOUIS KLAFF.